(12) United States Patent
Li et al.

(10) Patent No.: US 9,763,274 B2
(45) Date of Patent: Sep. 12, 2017

(54) METHOD AND APPARATUS FOR DEVICE-TO-DEVICE COMMUNICATION

(71) Applicant: Nokia Technologies Oy, Espoo (FI)

(72) Inventors: Haitao Li, Beijing (CN); Zexian Li, Espoo (FI); Yixue Lei, Beijing (CN); Yang Liu, Beijing (CN); Kodo Shu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/440,607

(22) PCT Filed: Nov. 6, 2012

(86) PCT No.: PCT/CN2012/084143
§ 371 (c)(1),
(2) Date: May 5, 2015

(87) PCT Pub. No.: WO2014/071555
PCT Pub. Date: May 15, 2014

(65) Prior Publication Data
US 2015/0289307 A1   Oct. 8, 2015

(51) Int. Cl.
*H04W 76/02* (2009.01)
*H04W 40/24* (2009.01)
(Continued)

(52) U.S. Cl.
CPC ......... *H04W 76/023* (2013.01); *H04W 8/005* (2013.01); *H04W 40/244* (2013.01);
(Continued)

(58) Field of Classification Search
CPC ....... H04W 8/00; H04W 8/005; H04W 40/24; H04W 40/244; H04W 72/02;
(Continued)

(56) References Cited

U.S. PATENT DOCUMENTS 8,509,105 B2 *   8/2013   Kneckt ............ H04W 74/0833
                                                            370/252
8,577,363 B2 *  11/2013   Wijting ............... H04W 76/023
                                                            455/426.1
(Continued)

FOREIGN PATENT DOCUMENTS

CN       102090132 A      6/2011
CN       102711105 A     10/2012

*Primary Examiner* — Tri H Phan
(74) *Attorney, Agent, or Firm* — Seppo Laine Oy (57) ABSTRACT

In accordance with an example embodiment of the present invention, there is provided an apparatus, comprising at least one processing core configured to determine an opportunity for device-to-device, D2D, communication, and at least one transmitter configured to cause transmitting of a D2D communication request, wherein the D2D communication request at least one of comprises a radio resource control signaling message and comprises an indication of a type of D2D communication that is requested. The indicated type may comprise D2D communication with no fallback to cellular connectivity, wherein such a D2D communication can be established without involving a core network, CN.

22 Claims, 5 Drawing Sheets

(51) Int. Cl.
*H04W 76/04* (2009.01)
*H04W 8/00* (2009.01)
*H04W 72/04* (2009.01)
*H04W 84/04* (2009.01)
*H04W 88/02* (2009.01)

(52) U.S. Cl.
CPC ...... *H04W 76/046* (2013.01); *H04W 72/0413* (2013.01); *H04W 84/042* (2013.01); *H04W 88/02* (2013.01)

(58) Field of Classification Search
CPC ......... H04W 72/0406; H04W 72/0413; H04W 72/042; H04W 76/02; H04W 76/023; H04W 76/04; H04W 76/046; H04W 84/042; H04W 88/02; H04W 92/18
USPC ................ 370/229–240, 310–350, 431–437; 455/431–466
See application file for complete search history.

(56) References Cited

U.S. PATENT DOCUMENTS

| | | | |
|---|---|---|---|
| 9,084,222 B2* | 7/2015 | Chai | H04W 76/02 |
| 9,107,202 B2* | 8/2015 | Doppler | H04W 72/0406 |
| 2008/0318612 A1* | 12/2008 | Axnas | H04W 76/023 455/522 |
| 2010/0009675 A1* | 1/2010 | Wijting | H04W 72/02 455/426.1 |
| 2011/0317569 A1 | 12/2011 | Kneckt et al. | |
| 2012/0179789 A1* | 7/2012 | Griot | H04W 12/08 709/220 |
| 2013/0148642 A1* | 6/2013 | Abraham | H04W 8/005 370/338 |
| 2013/0148643 A1* | 6/2013 | Abraham | H04W 8/005 370/338 |
| 2013/0287012 A1* | 10/2013 | Pragada | H04W 76/045 370/338 |
| 2014/0056220 A1* | 2/2014 | Poitau | H04W 76/023 370/328 |
| 2014/0112194 A1* | 4/2014 | Novlan | H04W 8/005 370/254 |
| 2014/0185495 A1* | 7/2014 | Kuchibhotla | H04W 76/023 370/281 |
| 2014/0185530 A1* | 7/2014 | Kuchibhotla | H04W 76/023 370/329 |
| 2014/0243038 A1* | 8/2014 | Schmidt | H04W 76/023 455/552.1 |
| 2014/0321314 A1* | 10/2014 | Fodor | H04W 72/085 370/252 |
| 2015/0201452 A1* | 7/2015 | Wang | H04W 8/005 455/426.1 |
| 2015/0208384 A1* | 7/2015 | Baghel | H04W 72/04 455/450 |
| 2016/0270136 A1* | 9/2016 | Liu | H04W 48/16 |
| 2017/0064736 A1* | 3/2017 | Yu | H04W 72/14 |

* cited by examiner

METHOD AND APPARATUS FOR DEVICE-TO-DEVICE COMMUNICATION

TECHNICAL FIELD

The present application relates generally to communicating between devices using radio resources, and managing radio resources for such communication.

BACKGROUND

Cellular communication networks typically comprise a radio access network comprising a set of base stations, and a core network comprising nodes tasked with managing the system and routing data to and from further networks, in some networks, the radio access network comprises in addition to base stations base station controlling nodes, such as for example radio network controller, RNC, nodes in a wideband code division multiple access, WCDMA, communication system. Another example of a base station controlling node is a base station controller, BSC, controller node in a global system for mobile communications, GSM, communication system.

Communication in a cellular communications network typically traverses the network, for example where a cellular telephone is called from a landline, the call will arrive from the landline network in a gateway node comprised in the core network of the cellular network, and be routed from there to the radio access network, for delivery from a base station in the radio access network, via a radio interface, to the called cellular telephone. Likewise where a cellular telephone calls another cellular telephone of the same network, the call may be routed via the radio access network and core network to the called cellular telephone.

On the radio interface, cellular communications may use radio resources allocated to such use, wherein the networks may manage use of the radio resources so as to allow users access to the system in an optimal way. Managing the radio resources may comprise balancing availability and quality of service, since the allocated radio resources may not be sufficient to provide maximal service continually to all users. The users may be further constrained by access to energy when their cellular telephones, or more generally terminals, are battery-powered.

In some cases, use of radio resources may be optimized by terminals of a cellular communications network communicating with each other directly in the sense that they receive radio signals from each other, rather than from a base station. In other words, information may be exchanged between the terminals so that the information isn't routed via a base station, rather the information is transmitted from a first terminal and received directly from the radio interface in a second terminal.

Direct communication between terminals may use radio resources also used when communicating with a base station, or alternatively direct communication may use different radio resources. When the same radio resources are used the cellular communications network may have an interest in at least partially controlling the direct communication, since resources used in the direct communication may become unavailable for other communication in the cellular communications network. Where different resources are used, the cellular communications network may also have an interest in at least partially controlling the direct communication, for example where interference is possible with resources of the cellular communications network, or where the network wants to charge the terminals for the direct communication, or for other reasons.

SUMMARY

Various aspects of examples of the invention are set out in the claims.

According to a first aspect of the present invention, there is provided an apparatus, comprising at least one processing core configured to determine an opportunity for device-to-device communication, and at least one transmitter configured to cause transmitting of a device-to-device communication request, wherein the device-to-device communication request at least one of comprises a radio resource control signaling message and comprises an indication of a type of device-to-device communication that is requested.

According to a second aspect of the present invention, there is provided a method, comprising determining an opportunity for device-to-device communication, and causing transmitting of a device-to-device communication request, wherein the device-to-device communication request at least one of comprises a radio resource control signaling message and comprises an indication of a type of device-to-device communication that is requested.

According to a third aspect of the present invention, there is provided an apparatus, comprising at least one processor, at least one memory including computer program code, the at least one memory and the computer program code being configured to, with the at least one processor, cause the apparatus to at least receive, using a cellular communication technology, device-to-device communication request from a first user equipment, and process the device-to-device communication request locally without involving a core network, wherein the device-to-device communication request at least one of comprises a radio resource control signaling message and comprises an indication of a type of device-to-device communication that is requested.

According to a fourth aspect of the present invention, there is provided a method, comprising receiving, using a cellular communication technology, a device-to-device communication request from a first user equipment, and processing the device-to-device communication request locally without involving a core network, wherein the device-to-device communication request at least one of comprises a radio resource control signaling message and comprises an indication of a type of device-to-device communication that is requested.

According to further aspects of the present invention, there are provided computer programs configured to cause methods in accordance with the second and fourth aspects of the present invention to be performed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
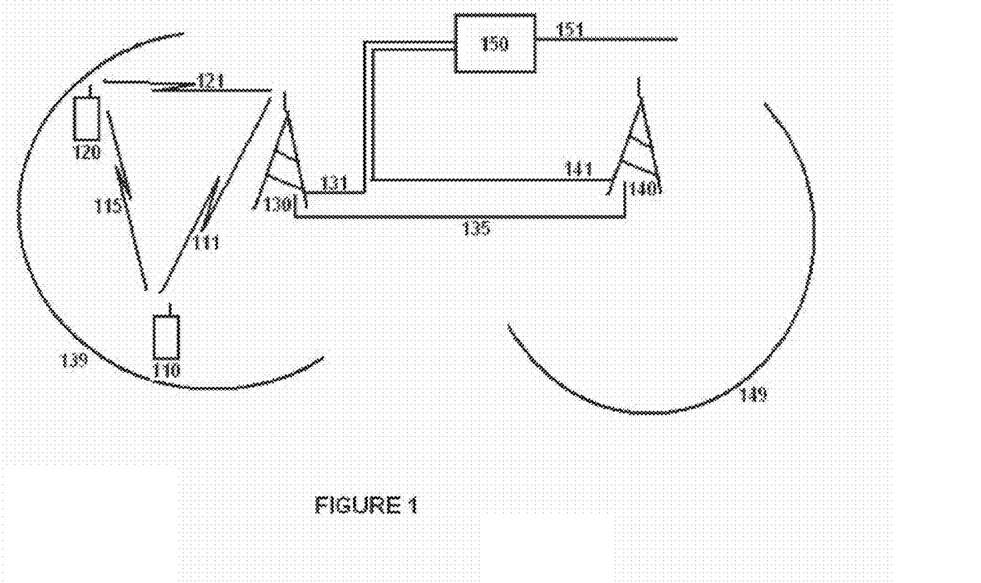
FIG. 1 illustrates a first system capable of supporting at least some embodiments of the invention.

FIG. 1 illustrates a first system capable of supporting at least some embodiments of the invention. Illustrated is terminal 110, which will hereinafter be referred to as mobile 110. Mobile 110 may comprise, for example, a smart phone, a tablet or laptop computer, cellular phone, personal digital assistant, machine for machine-to-machine, M2M, automated device or another similar apparatus. Mobile 110 may be a user equipment, UE, in the sense of wideband code division multiple access, WCDMA, or long term evolution, LTE, standards defined by the third generation partnership project, 3GPP, for example. FIG. 1 illustrates also mobile 120, which may be a similar device as mobile 110 in the sense of being a user equipment or terminal of the cellular network of FIG. 1. While the term "mobile" is used herein, it is understood that in some embodiments at least some of these devices may in fact be stationary.

FIG. 1 also illustrates base station 130 and base station 140. Base station 130 and base station 140 may be essentially similar, for example they may act as base stations in the same system. In some embodiments, base station 130 and base station 140 are base stations comprised in a WCDMA or LTE cellular system. As a terminological point, a WCDMA base station may be known as a node-B. Similarly a LTE base station may be known as an eNB. Mobile 110 may be communicatively connected to base station 130 via wireless link 111. Wireless link 111 may operate in accordance with a defined standard, for example WCDMA or LTE, or where mobile 110 is capable of communicating with wireless local area network, WLAN, access points wireless link 111 may operate in accordance with WLAN standards. Also other standards, all of which cannot be named here for the sake of conciseness, are possible. Wireless link 111 may comprise an uplink for conveying information from mobile 110 to base station 130. Wireless link 111 may comprise a downlink for conveying information from base station 130 to mobile 110. The uplink and/or downlink of wireless link 111 may operate in a time division multiple access, TDMA, frequency-division multiple access, FDMA, code-division multiple access, CDMA, orthogonal frequency division multiple access, OFDMA, manner or in a manner that is a combination of at least two of the foregoing multiple access methods. The uplink and/or downlink of wireless link 111 may operate in a time division multiplexing, TDD or frequency division multiplexing, FDD manner.

Mobile 120 may be configured to communicate with base station 130 via wireless link 121, which may like wireless link 111 comprise an uplink and downlink, and operate in accordance with TDMA, FDMA, CDMA and/or OFDMA. Mobiles 110 and 120 are illustrated as being inside a cell coverage area 139 of base station 130, in other words they are inside a coverage area of a cell controlled by base station 130. Mobiles 110 and 120 may be attached to base station 130 in the sense that a cell controlled by base station 130 is a serving cell for these mobiles.

Base station 130 may be configured to communicate with core network node 150 via connection 131. Connection 131 may comprise a wire-line connection, or alternatively connection 131 may be at least in part wireless. Core network node 150 may perform functions related to controlling the cellular communications network, such as switching, acting as a gateway, a subscriber information repository, an authentication center or other core network function. The core network may comprise further core network nodes, which are not illustrated. Core network node 150 may communicate with such further core network nodes via connection 151, for example. In an LTE network, connection 131 may comprise an S1 interface.

Base station 130 may be configured to communicate with base station 140 via connection 135, which may be a wire-line or wireless connection. In an LTE network, connection 135 may comprise a X2 interface, or a modified X2 interface. Base station 140 may be configured to communicate with core network node 150 via connection 141. Base station 140 may control a cell, the coverage area of which is illustrated in FIG. 1 as 149.

Mobiles 120 and 130 may be configured to engage in direct communication over wireless link 115. Such direct communication between two terminals may be referred to as device-to-device communication. Device-to-device communication may thus comprise that information is transmitted from mobile 110 using a radio transmitter, and received in mobile 120 using a radio receiver, such that radio frequency energy is received in mobile 120 that was transmitted from mobile 110, and the transmitted information is not relayed via a base station. Wireless link 115 may employ radio resources used in communication between mobiles and base station 130, or alternatively wireless link 115 may employ different radio resources.

Radio resources may be defined in terms of at least one of frequency, time, spreading codes and space. When radio resources are defined in terms of frequency, frequency channels or bands may be defined. Users may transmit simultaneously, but without interference since the transmissions will occur on non-overlapping frequencies. When radio resources are defined in terms of time, time-slicing, timeslots or time frames may be defined, for example to allow a frequency channel to be shared between users such that the users don't interfere with each other since their transmissions don't occur simultaneously. When radio resources are defined in terms spreading codes, users may be allowed to transmit simultaneously on the same frequency band. Interference in this case is controlled by allocating orthogonal spreading codes to the transmissions. When radio resources are defined in terms of space, radio transmissions may be allocated in a directional and/or locational sense, allowing transmitters to transmit on the same frequency at the same time without producing interference due to physical separation between the transmissions, which may involve beamforming techniques. An example of defining radio resources in terms of space is a cellular communications network employing a frequency re-use pattern, wherein the same frequencies are used in cells that are not adjacent to each other. Another example is a sectorized base station. Radio resources employed by wireless links 111, 121 and/or 115 may be defined in terms of at least one of frequency, time, spreading codes and space.

Device-to-device, D2D, communication may exist in at least two different types. A first type of D2D communication comprises D2D communication that is configured with a backup cellular capability. Such a D2D communication can be switched to a cellular connection between the participating devices in case the devices move away from each other, or the D2D connection between then is for another reason severed. For example, where mobile 110 calls mobile 120 to effect bidirectional D2D voice communication, the communicating users may want the call to continue, even in case the user of mobile 120 boards a bus which transports mobile 120 to another area. In this case, core network node 150 may be made aware of the D2D communication, and responsive to receiving a report from a mobile participating in the D2D communication that the D2D communication connection is severed, core network node 150 may be configured to page the participating devices and cause a cellular connection to be formed between the participating devices. In effect, the devices can fallback to a cellular connection. For example, core network node 150 may be configured to cause a voice call to be created between mobiles 110 and 120 responsive to receiving a report from mobile 110 that it can no longer communicate with mobile 120 using a D2D communication. Core network node 150, which may already be aware of the existence and type of D2D communication between the mobiles before the D2D connection is broken, can relatively seamlessly restore the connection via the cellular network as it may have followed the location of both mobiles during the D2D communication.

A second type of D2D communication comprises D2D communication that is not configured with a backup cellular capability. For example, where mobile 120 is an advertising unit configured to provide information on special offers of a restaurant to nearby mobiles, or information concerning an amount of fuel available in a fuel tank, or more generally any information that has local scope, a fallback to a cellular connection could be unnecessary since a mobile moving out of range of D2D communication would be unlikely to be able to benefit from the information available via the D2D connection. In some embodiments where mobile 120 is configured to provide locally relevant information, mobile 120 is not strictly mobile in the sense that it would move, rather it may be seen as a user equipment or device that may be stationary.

A mobile may determine that a D2D communication opportunity exists in various ways. For example, a mobile may receive a beacon transmission from another mobile, the beacon transmission comprising information on available D2D communication. The information may comprise, for example, at least one of an identity of the beaconing device/mobile, D2D radio resources to be used, a D2D communication technology to be used and metadata on information that can be obtained via D2D communication. A beacon may be transmitted by broadcasting, without the beacon being directed to or intended for any recipient in particular. Alternatively or additionally, a mobile may determine that a D2D communication opportunity exists by receiving from a network node an information message indicating that a D2D communication opportunity exists in the present location of the mobile. For example, the mobile may have subscribed to receive such messages, responsive to which the network node may follow the location of the mobile and compare it to known locations of D2D communication opportunities, and responsive to determining that the mobile is sufficiently near such an opportunity, trigger the sending of the message. Such a network node may comprise, for example, a base station or a core network node.

A beacon received from another mobile can be used to determine an estimate of pathloss between the mobiles. The mobile receiving the beacon can measure a received signal strength of the received beacon and compare it to a known transmit power to estimate, how much energy was lost in transmission to determine the pathloss estimate. The receiving mobile may know the transmit power from the beacon, wherein the beacon may comprise an indication of a transmit power used to transmit the beacon or the receiving mobile may know that all beacons are transmitted using a preconfigured transmit power level. The receiving mobile may know the preconfigured transmit power level from an industry specification, or it may be received from a base station controlling a cell where the receiving mobile finds itself, for example.

Upon determining that an opportunity for D2D communication exists, a mobile has the option of initiating a request for D2D communication. A mobile may be configured to initiate the request responsive to determining that an opportunity exists, or alternatively a mobile may be configured to initiate the request when at least one further condition is met, in addition to the opportunity being determined to exist. Examples of further conditions may include a user accepting a prompt, the mobile being configured to seek a certain kind of information and the determining being accomplished in a certain way, for example by network message or from a beacon. In some embodiments, the mobile may be configured to seek information on restaurants or hair salon offers and responsive to receiving metadata that a D2D communication opportunity may provide such information, the mobile may be configured to initiate the request for D2D communication, optionally after prompting a user to accept.

Mobile 110 may be configured to initiate the request for D2D communication by signaling, over wireless link 111, to base station 130. The request may comprise an estimate of link quality, such as for example an indication of pathloss determined as described above. Base station 130 may responsive to receiving the request for D2D communication ask mobile 120, identified in the request, for acceptance over wireless link 121, and responsive to mobile 120 indicating over wireless link 121 acceptance D2D communication with mobile 110, base station 130 may be configured to allocate radio resources to D2D communication between mobile 110 and mobile 120. Allocating radio resources may take into account a pathloss estimate received in the request from mobile 110. Taking the pathloss estimate into account may comprise setting a maximum transmit power accordingly, or allocating enough spectrum band to allow the mobiles to communicate, in view of the pathloss, or more generally link quality. The allocating may comprise informing at least one of mobile 110 and mobile 120 of the allocated resources. Where the D2D communication is to be configured with backup cellular capability, base station 130 may be configured to coordinate the establishment of the D2D communication with core network node 150, to enable the cellular fallback option in case D2D communication between the mobiles fails. Where backup cellular capability is configured, the D2D communication may be monitored in core network node 150 until the D2D communication ends, at which point at least one of mobile 110 and mobile 120 may be configured to inform base station 130 of the ending of the D2D communication. Base station 130 may inform core network node 150 of the ending of the D2D communication by signaling via connection 131. Responsive to learning that the D2D communication between mobile 110 and mobile 120 has ended, core network node 150 may cease monitoring the D2D communication.

In some embodiments, core network node 150 is configured to communicate with further core network nodes in connection with establishing the D2D communication, for example to cause charging, authentication and/or authorization to occur. For example, core network node 150 may inquire from a further core network node, if both mobiles 110 and 120 are associated with subscriptions that allow D2D communication. If at least one of the subscriptions doesn't allow D2D communication, core network node 150 may be configured to inform base station 130 that the D2D communication request is to be denied, and responsively base station 130 may refrain from allocating radio resources to the D2D communication. Therefore, in general where the D2D communication is to be configured with backup cellular capability, a signaling procedure may be triggered in and/or with the core network.

Where backup cellular capability is not needed, base station 130 may be capable of initiating, maintaining and terminating the D2D communication either alone, or in co-operation with other base stations without involving the core network. In some embodiments, base station 130 is capable of initiating, maintaining and terminating the D2D communication together with other radio access network nodes without involving the core network.

Mobile 110 may be configured to initiate a request for D2D communication, which may explicitly or implicitly indicate that backup cellular capability is not needed. For example, mobile 110 may transmit a request for D2D communication using radio resource control, RRC, signaling, which is terminated at base station 130. Base station 130 may be configured to process the request for D2D communication without involving the core network responsive to determining that the request for D2D communication was transmitted to base station 130 using RRC signaling. In some embodiments, base station 130 is configured to process all requests for D2D signaling without involving the core network, in some embodiments, mobile 110 is configured to determine a type of D2D communication that is being requested, and responsive to determining that the D2D communication requested is of local scope, mobile 110 may be configured to include in the request for D2D communication an indication that the D2D communication requested doesn't need backup cellular capability. The indication may take the form of a preconfigured bit or bits that are set to a certain value to indicate that backup cellular capability isn't needed for the D2D communication requested in the request. Alternatively, sending the request for D2D communication using RRC signaling may be an indication that backup cellular capability isn't needed.

Where backup cellular capability isn't needed, establishing the D2D communication without involving the core network provides a benefit by eliminating signaling involving the core network. Where acceptance of the core network isn't requested, delay in setting up the D2D communication may also be reduced since base station 130 needn't wait for permission from the core network before proceeding to allocate radio resources to the D2D communication.

In general, there is provided, a first apparatus, such as for example mobile 110 or a similar device or a control device for inclusion in mobile 110 to control the functioning thereof. The first apparatus comprises at least one processing core configured to determine that an opportunity for D2D communication exists. Determining that an opportunity for D2D communication exists may comprise determining that such an opportunity exists for the first apparatus. An opportunity may comprise that it is possible or probable that a D2D communication could be established. Where the device comprises a control device such as a processor, application-specific integrated circuit or similar, the at least one processing core may be comprised in the control device. The first apparatus further comprises at least one transmitter configured to cause a D2D communication request to be transmitted, wherein the D2D communication request at least one of comprises a radio resource control signaling message and comprises an indication of a type of D2D communication that is requested. In other words, the D2D communication request comprises a radio resource control signaling message and/or indication of a type of device-to-device communication that is requested. Where the first apparatus comprises mobile 110, for example, the causing to be transmitted may occur in a radio transceiver comprised in mobile 110, and the transmitter may comprise the radio transceiver. Where the first apparatus comprises a control device, the causing to be transmitted may occur in an input/output device comprised in the control device, such as for example a serial or parallel input/output port and associated pin or pins, in this case, the transmitter may comprise the serial or parallel input/output port and associated pin or pins. The input/output device may signal, using the pin or pins, internally in mobile 110, for example, to a radio transceiver comprised in mobile 110 to cause the radio transceiver to transmit a the request. The signaling internally in mobile 110 may take place via electrical leads connecting the pin or pins of the input/output device to the radio transceiver.

The indication of a type of a D2D communication may indicate a type of a D2D communication selected in the first apparatus from a list comprising at least two types of D2D communication. In other words, the first apparatus may be configured to select a type of D2D communication from a list comprising at least two types of D2D communication, and include in the request an indication of the selected type.

In some embodiments, the indicated type of D2D communication comprises D2D communication without backup cellular capability. In some embodiments, the indicated type of D2D communication comprises D2D communication with backup cellular capability. In some embodiments, the indicated type of D2D communication comprises D2D communication with limited cellular capability. Backup cellular capability may comprise a capability to fallback to a cellular connection, via at least one base station, in case the D2D communication fails. D2D communication with limited cellular capability may comprise D2D communication that is authorized in the core network, but which doesn't have fallback capability. An advantage of such a type of communication may be that only limited core network involvement is needed in connection with establishing it, for example, core network node 150 may be capable of handling the core network part of the establishing without involving further core network nodes.

In some embodiments, the determining that an opportunity for D2D communication exists comprises at least one of receiving a device-to-device beacon and receiving information from a network element. The beacon may be broadcasted from at least one of a user equipment or a base station. The beacon may comprise information indicating that a D2D communication opportunity exists. The information received from a network element may comprise information indicating that a D2D communication opportunity exists in the location where the first apparatus presently finds itself. The network element may comprise a device-to-device registration server function, DRSF. In some embodiments, the beacon or information received from a network element comprises information concerning which type of D2D communication is available.

In some embodiments, the first apparatus is configured to transmit or cause to be transmitted, the request for D2D communication using a cellular communication technology. The request may be transmitted via wireless link 111 for example. The cellular communication technology may comprise, for example, GSM, WCDMA, LTE or another cellular technology. In some embodiments, the first apparatus is configured to participate in D2D communication with another device using a cellular technology. In other embodiments the first apparatus is configured to participate in D2D communication with another device using a non-cellular technology, such as for example Bluetooth or wireless local area network, WLAN. The D2D communication may use radio resources allocated to a cellular network, or alternatively radio resources not allocated to a cellular network, such as license-exempt radio resources or other frequency radio resource such as authorized shared access band. Participating in D2D communication with another mobile using a certain technology may comprise that a wireless link between the mobiles performs in accordance with the certain technology.

In some embodiments the D2D communication request comprises an estimate of link quality between two devices, such as for example a pathloss estimate. Another example of a link quality estimate is a block error rate determined from receiving broadcasted messages from another device.

In general there is provided a second apparatus such as for example a base station, such as base station 130, or a control device for inclusion in a base station, to control the functioning thereof. The control device may comprise an integrated chip or chipset, for example. The second apparatus is configured with computer instructions stored in a memory, which are configured to cause the second apparatus to at least receive a D2D communication request from a first user equipment, and process the D2D communication request locally without involving a core network, wherein the D2D communication request at least one of comprises a RRC signaling message and comprises an indication of a type of D2D communication that is requested. The receiving may take place using a cellular communication technology, for example. The second apparatus may be configured to process the request locally responsive to the request comprising a RRC message or the indication. The second apparatus may be configured, in the absence of the indication in the request, to process the request at least in part by signaling to a core network element. In some embodiments, the second apparatus is configured to process the request at least in part by signaling to a core network element responsive to the request not comprising a RRC signaling message.

In some embodiments, processing the D2D communication request locally comprises querying a second user equipment for acceptance of the D2D communication, and in case the second user equipment indicates acceptance, allocating radio resources for the D2D communication. This achieves the advantage that radio resources are only allocated in case both user equipments indicate a willingness to participate in the D2D communication, and avoids the case where radio resources are allocated to a D2D communication that will have to be de-allocated if the second user equipment refuses to participate in the D2D communication.

Figure 3:
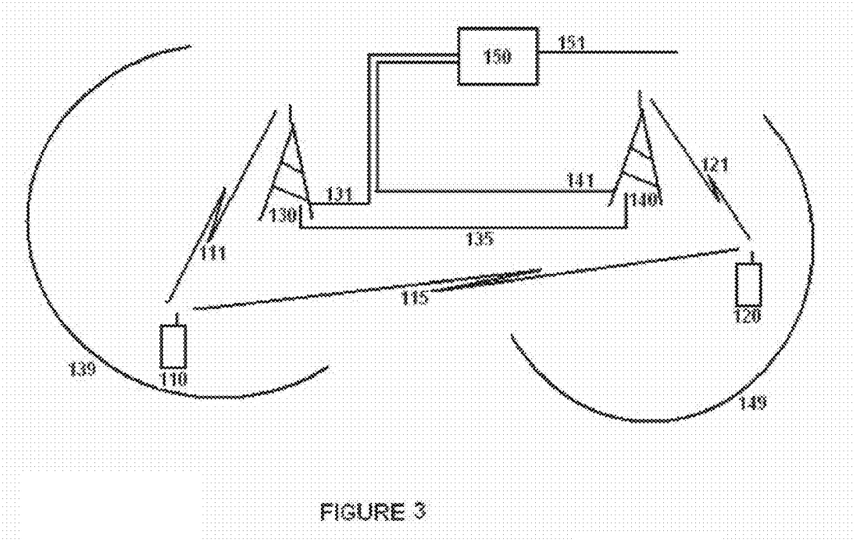
FIG. 3 illustrates a second system capable of supporting at least some embodiments of the invention.

FIG. 3 illustrates a second system capable of supporting at least some embodiments of the invention. FIG. 3 resembles FIG. 1 with like reference numbers relating to like units. In FIG. 3, mobile 120 is in a cell coverage area 149 of a cell controlled by base station 140. Wireless link 115 partly traverses cell coverage area 139 and cell coverage area 149. In the embodiment of FIG. 3, base station 130 may be configured to process a D2D communication request from mobile 110 locally in the radio access network, without involving core network node 150, by communicating with base station 140 via connection 135. For example, to query mobile 120 for acceptance of a D2D communication, base station 130 may be configured to ask over connection 135 base station 140 to query mobile 120, and to receive over connection 135 an indication of the response received from mobile 120. The allocating of radio resources to the D2D communication may occur in co-operation between base station 130 and base station 140, in that base station 130 allocates radio resources in cell coverage area 139 and base station 140 allocates radio resources in cell coverage area 149. When the D2D communication is terminated, for example by mobile 120, mobile 120 may be configured to transmit an indication of the termination to base station 140 via wireless link 121, responsive to which base station 140 may be configured to indicate the termination to base station 130 via connection 135. Base station 140 de-allocates the radio resources allocated to the D2D connection in cell coverage area 149, and base station 130 does likewise, for the radio resources allocated to the D2D connection in cell coverage area 139.

Figure 4:
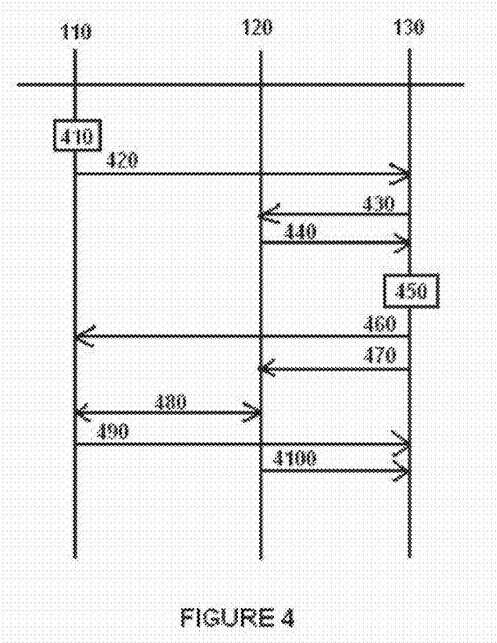
FIG. 4 illustrates signaling according to at least one embodiment of the invention.

FIG. 4 illustrates signaling according to at least one embodiment of the invention. The vertical axes correspond to mobile 110, mobile 120 and base station 130, respectively. At the beginning of the procedure, mobiles 110 and 120 are in a connected state. In phase 410, mobile 110 determines an opportunity for a D2D communication with mobile 120, for example by receiving a beacon transmission from mobile 120 or base station 130, or an indication from base station 130. Such an indication may be conveyed in a signaling message addressed to mobile 110, for example. In phase 420, at least in part responsive to phase 410, mobile 110 transmits a D2D communication request to base station 130. The request may comprise at least one of an identity of mobile 110, an identity of mobile 120, a link quality estimate determined between mobile 110 and mobile 120 using the beacon transmission, and a service mobile 110 is interested in obtaining from mobile 120 via the D2D communication. In phase 430, base station 130 queries mobile 120 to find out, if mobile 120 is interested in participating in a D2D communication with mobile 110. The query message of phase 430 may comprise at least one of an identity of mobile 110 and a service mobile 110 is interested in obtaining from or offering to mobile 120 via the D2D communication. Responsive to receiving the query message of phase 430, mobile 120 decides on whether it wants to participate in a D2D communication with mobile 110 and in phase 440, mobile 120 indicates whether it wants to participate in a D2D communication with mobile 110 by transmitting a signaling message to base station 130. Phases 430 and 440 are optional as in some embodiments base station 130 is not configured to query mobile 120 before proceeding to radio resource allocation.

In phase 450, if mobile 120 replied in the affirmative in phase 440, base station 130 is configured to decide on radio resources to be allocated to the D2D communication between mobile 110 and mobile 120. In phases 460 and 470, base station 130 indicates the allocated radio resources to mobiles 110 and 120, respectively. Responsive to being informed of radio resources allocated to the D2D communication, mobiles 110 and 120 initiate a D2D communication in phase 480, for example by performing a contention free, random access procedure with each other. Optionally, in phases 490 and 4100, mobiles 110 and 120 may inform base station 130 of successful startup of the D2D connection between the mobiles. In embodiments that support D2D communication involving mobiles under different base stations, the base stations may co-operate to cause the D2D communication to occur using, for example, a connection connecting the base stations with each other to enable them to exchange signaling messages without involving a core network. An example of such a connection is connection 135 of FIG. 3. In such cases, each mobile would communicate with the base station it is attached to.

Figure 5:
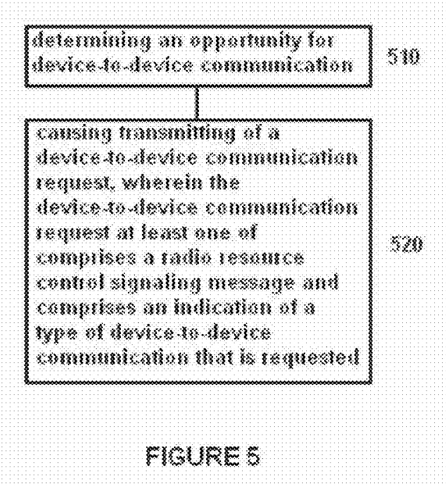
FIG. 5 is a flowchart of a first method according to at least some embodiments of the invention.

FIG. 5 is a flowchart of a first method according to at least some embodiments of the invention. The method illustrated in FIG. 5 may be performed in mobile 110, for example. In phase 510 the existence of an opportunity for D2D communication is determined. The opportunity may involve at least one of certain device, a certain time and a certain location. In phase 520, transmitting of a device-to-device communication request is caused, wherein the device-to-device communication request, at least one of comprises a radio resource control signaling message and comprises an indication of a type of device-to-device communication that is requested. The method may further comprise selecting a type of D2D communication from among a plurality of possible types of D2D communication.

Figure 6:
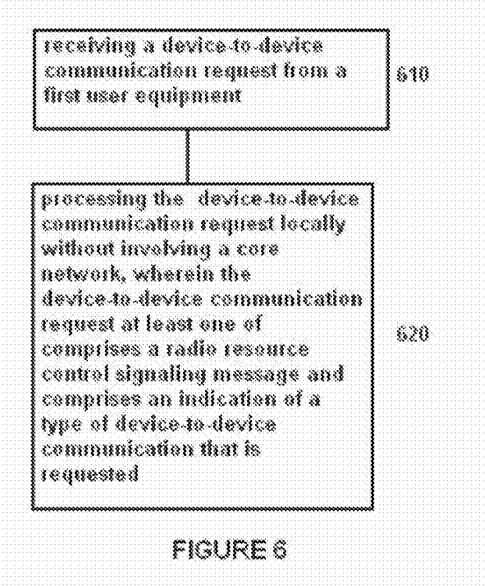
FIG. 6 is a flowchart of a second method according to at least some embodiments of the invention.

FIG. 6 is a flowchart of a second method according to at least some embodiments of the invention. The method illustrated in FIG. 5 may be performed in base station 130, for example. In phase 610, a device-to-device communication request is received from a first user equipment. The receiving may take place using a cellular communication technology, for example. In phase 620, the device-to-device communication request is processed locally without involving a core network, wherein the device-to-device communication request at least one of comprises a radio resource control signaling message and comprises an indication of a type of device-to-device communication that is requested.

Figure 2:
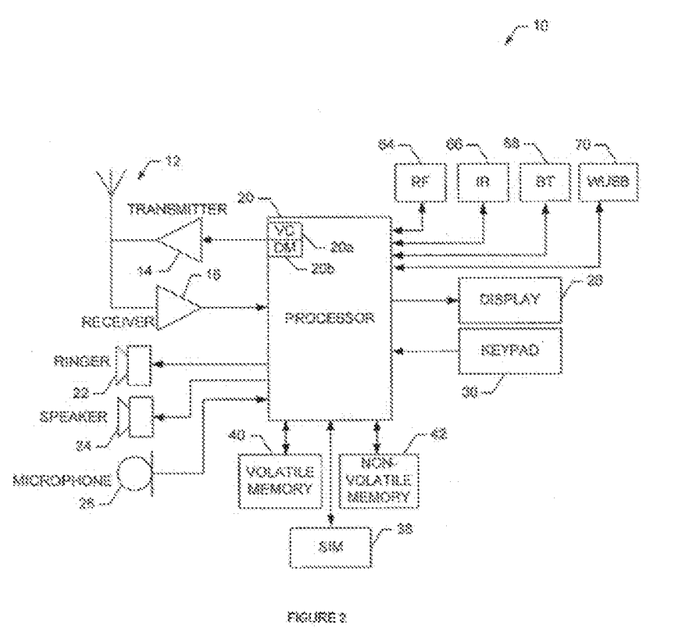
FIG. 2 illustrates a block diagram of an apparatus 10 such as, for example, a user equipment, in accordance with an example embodiment of the invention.

FIG. 2 illustrates a block diagram of an apparatus 10 such as, for example, a user equipment, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi wireless local access network, WLAN, techniques such as Institute of Electrical and Electronics Engineers, IEEE, 802.11, 802.16 and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service, GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood, that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20*a*, an internal data modem, DM 20*b*, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser.

The connectivity program may allow the mobile terminal 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device, in embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and in particular, the short-range transceiver may be capable of data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and or the like, which may store information elements related to a mobile subscriber. In addition to the SIM, the apparatus may comprise other removable and/or fixed memory. The apparatus 10 may include volatile memory 40 an non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that unnecessary signaling in and/or to a core network may be eliminated. Another technical effect of one or more of the example embodiments disclosed herein is that delays in setting up D2D connections can be reduced.

Embodiments of the present, invention may be implemented in software, hardware, application logic or a combination of software, hardware and application logic. The software, application logic and/or hardware may reside on memory 40, the control apparatus 20 or electronic components, for example, in an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims other aspects of the invention comprise other combinations of features from the described embodiments and/or the dependent claims with the features of the independent claims, and not solely the combinations explicitly set out in the claims.

It is also noted herein that while the above describes example embodiments the invention, these descriptions should not be viewed in a limiting sense. Rather, there are several variations and modifications which may be made without departing from the scope of the present invention as defined in the appended claims.

What is claimed is:

1. A user equipment apparatus, comprising:
   at least one processing core configured to determine an opportunity for device-to-device communication, and
   at least one transmitter configured to cause transmitting of a device-to-device communication request, wherein the device-to-device communication request at least one of comprises a radio resource control signaling message and comprises an indication of a type of device-to-device communication that is requested.

2. The apparatus according to claim 1, further comprising a cellular user equipment and wherein device-to-device communication comprises direct radio communication between the apparatus and another cellular user equipment.

3. The apparatus according to claim 1, wherein the indicated type of device-to-device communication comprises device-to-device communication without backup cellular capability.

4. The apparatus according to claim 1, wherein the determining comprises at least one of receiving a device-to-device beacon transmission and receiving information from a network element.

5. The apparatus according to claim 4, wherein the network element comprises a device-to-device registration server function.

6. The apparatus according to claim 4, wherein the received information comprises information relating to a type of device-to-device communication available.

7. The apparatus according to claim 1, wherein the apparatus is configured to transmit the device-to-device communication request using a cellular communication technology.

8. The apparatus according to claim 1, wherein the apparatus is configured to participate in device-to-device communication using a cellular communication technology.

9. The apparatus according to claim 1, wherein the apparatus is configured to participate in device-to-device communication using a non-cellular communication technology.

10. The apparatus according to claim 1, wherein the device-to-device communication request comprises an estimate of link quality between two apparatuses.

11. The apparatus according to claim 10, wherein the estimate of link quality between two apparatuses comprises an estimate of pathloss.

12. The apparatus according to claim 1, wherein the apparatus comprises a mobile communication device, the apparatus further comprising an antenna coupled to the transmitter and configured to provide signals to the at least one processing core.

13. A method, comprising:
 determining, in a user equipment, an opportunity for device-to-device communication, and
 causing transmitting, from the user equipment, of a device-to-device communication request,
 wherein the device-to-device communication request comprises at least one of a radio resource control signaling message and an indication of a type of device-to-device communication that is requested.

14. The method according to claim 13, wherein the indicated type of device-to-device communication comprises device-to-device communication without backup cellular capability.

15. The method according to claim 13, wherein the determining comprises at least one of receiving a device-to-device beacon transmission and receiving information from a network element.

16. The method according to claim 15, wherein the network element comprises a device-to-device registration server function.

17. The method according to claim 13, wherein the device-to-device communication request comprises an estimate of link quality between two apparatuses.

18. An apparatus, comprising:
 at least one processor and at least one memory including computer program code, the at least one memory and the computer program code configured to, with the at least one processor, cause the apparatus to perform at least the following:
 receive a device-to-device communication request from a first user equipment, and
 process the device-to-device communication request locally without involving a core network, wherein the device-to-device communication request comprises at least one of a radio resource control signaling message and an indication of a type of device-to-device communication that is requested.

19. The apparatus according to claim 18, wherein processing the device-to-device communication request comprises querying a second user equipment for acceptance of the device-to-device communication, and in case the second user equipment accepts the device-to-device communication, allocating radio resources for device-to-device communication between the first and second user equipments.

20. The apparatus according to claim 18, wherein the indicated type of device-to-device communication comprises device-to-device communication without backup cellular capability.

21. A method, comprising:
 receiving a device-to-device communication request from a first user equipment, and
 processing the device-to-device communication request locally without involving a core network, wherein the device-to-device communication request comprises at least one of a radio resource control signaling message and an indication of a type of device-to-device communication that is requested.

22. A computer program product comprising a non-transitory computer-readable medium bearing computer program code embodied therein for use with a computer, the computer program code to perform a method comprising:
 determining, in a user equipment an opportunity for device-to-device communication, and
 transmitting, from the user equipment, a device-to-device communication request, wherein the device-to-device communication request comprises at least one of a radio resource control signaling message and an indication of a type of device-to-device communication that is requested.

* * * * *